H. J. SCHWADE.
HIGH PRESSURE CENTRIFUGAL PUMP.
APPLICATION FILED SEPT. 8, 1909.
980,684.
Patented Jan. 3, 1911.
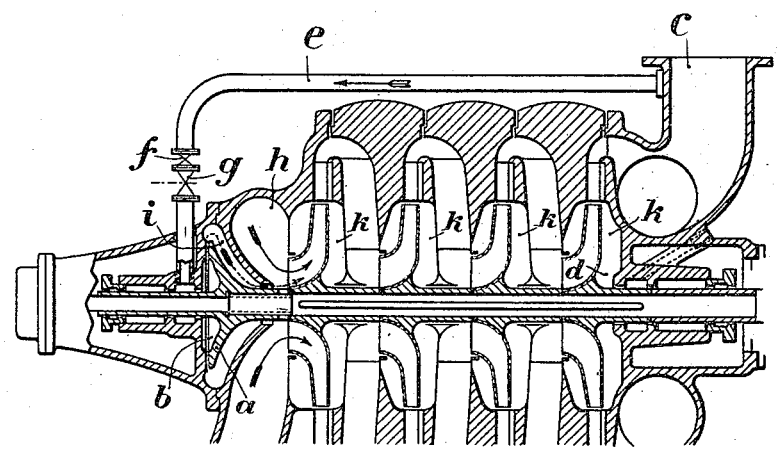

UNITED STATES PATENT OFFICE.

HANS JAMES SCHWADE, OF ERFURT, GERMANY.

HIGH-PRESSURE CENTRIFUGAL PUMP.

980,684.  Specification of Letters Patent.  Patented Jan. 3, 1911.

Application filed September 8, 1909. Serial No. 516,709.

*To all whom it may concern:*

Be it known that I, HANS JAMES SCHWADE, a subject of the King of Prussia, residing at Erfurt, in the Kingdom of Prussia and German Empire, have invented certain new and useful Improvements in High-Pressure Centrifugal Pumps, of which the following is a specification.

My invention relates to centrifugal pumps having rotating wheels or rotors incased only on one side, and more particularly to high pressure centrifugal pumps arranged in stages with several wheels mounted one behind another on the same spindle. In such constructions there is more or less axial thrust on the pump spindle acting in the direction toward the suction side. Constructions are known for taking up or neutralizing this axial thrust partly with and partly without the use of a thrust bearing. The two well known methods of neutralizing are known as Jaeger's construction and Sulzer's construction. The Jaeger construction uses a packing ring behind each rotating wheel for neutralizing, and perforations in the wall of the rotating wheel, also a thrust bearing for taking up the remainder of the axial thrust. Sulzer's construction consists of a relief disk mounted behind the last wheel on the discharge side, exposed on one side to the whole pressure of the last wheel, while on the other side it is in communication with the atmosphere.

The automatically acting axial pressure regulator according to this invention is, on the contrary, characterized by the relief disk, or the relief piston, being exposed on one side to the full pressure of the last rotating wheel, while on the other side it is in direct communication with a vacuum, for which reason it is preferably mounted in the suction bend in front of the first wheel. This relief device acts in such manner that the high pressure water of the relief device, at the moment when the spindle is being thrust toward the discharge branch, is in direct communication with the vacuum by means of a channel, whereby the high pressure on the relief device is reduced, but the spindle is again at once automatically pushed to this side, and the channel again reduced, and in that way the axial pressure is completely neutralized by means of automatic oscillations of the spindle of almost infinitely small amplitude without the use of a thrust bearing. Moreover, in the present invention the pressure water seal of the suction stuffing box can be combined with the axial pressure regulator in question; that is to say, no separate water seal will be necessary. The automatic axial pressure regulator according to this invention has the further advantage that a throttle valve or cock may be mounted if required in the connection conduit between the relief disk and the high pressure or discharge branch of the pump, by means of which throttle a further regulation of the water pressure can be effected without it being necessary to dismount any portion of the pump. When the water contains sand or other impurities, it is possible, for the purpose of protecting the relief device, to mount a filter in the said connection between the pressure or discharge branch and the relief device.

The automatically acting axial pressure regulator according to this invention differs therefore from known axial pressure regulators chiefly by the fact that its relief disk is in communication on one side with the high pressure or discharge branch behind the last wheel, and on the other side with the vacuum chamber, all perforations of the rotating wheel walls and all packing rings behind the larger rotating wheel walls being at the same time unnecessary.

A construction of the relief device according to this invention is illustrated by way of example in the accompanying drawing in which—

$a$ is the relief disk or piston, $b$ the high pressure chamber of the relief device which is in communication with the discharge branch $c$, and thus, indirectly, with the high pressure chamber $d$ behind the last rotating wheel, by means of the conduit or pipe $e$. The filter $f$ and the throttle valve $g$ are also diagrammatically indicated. The vacuum or suction chamber $h$ is in open communication with the conducting chamber $i$ behind the relief device $a$, so that on that side of the relief device there is always a vacuum. The single rotating wheels have no perforations and there are no packing rings on the back at $k$.

What I claim is:

In a high pressure centrifugal pump, the combination, with a spindle and a plurality of wheels mounted thereon; of a casing wherein said wheels are disposed provided with a pair of interiorly-located spaced walls producing a chamber therebetween, the rear wall being formed with an opening leading into the suction chamber in front of the first wheel, and the front wall with an opening in communication with the exit side of the pump behind the last wheel; and a relief disk secured to said spindle within the first-named chamber, said disk having its rear face spaced from the rear wall of said chamber to provide a conduit leading to the suction chamber, and its front face spaced from the front wall of said chamber to provide a channel leading to the said conduit.

In testimony whereof I have hereunto set my hand in presence of two subscribing witnesses.

HANS JAMES SCHWADE.

Witnesses:
  ERNST EBERHARDT,
  HANS SCHNUCK.